United States Patent
Su et al.

(10) Patent No.: US 11,346,806 B2
(45) Date of Patent: May 31, 2022

(54) LOW PROFILE IONIZATION DETECTOR

(71) Applicant: HONEYWELL INTERNATIONAL INC., Charlotte, NC (US)

(72) Inventors: Aimin Su, Shanghai (CN); Bing Chen, Shanghai (CN); Junhui Zhang, Shanghai (CN); Feng Liang, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 21 days.

(21) Appl. No.: 16/763,334

(22) PCT Filed: Nov. 20, 2017

(86) PCT No.: PCT/US2017/062483
§ 371 (c)(1),
(2) Date: May 12, 2020

(87) PCT Pub. No.: WO2019/099044
PCT Pub. Date: May 23, 2019

(65) Prior Publication Data
US 2020/0333292 A1    Oct. 22, 2020

(51) Int. Cl.
*G01R 31/00*    (2006.01)
*G01N 27/62*    (2021.01)
(52) U.S. Cl.
CPC .................... *G01N 27/62* (2013.01)
(58) Field of Classification Search
USPC ...................... 324/464; 250/423 P
See application file for complete search history.

(56) References Cited

U.S. PATENT DOCUMENTS 9,178,032 B2    11/2015   Yu et al.
2002/0179846 A1*  12/2002   Sun ............... G01N 33/0029
                                              250/423 P
(Continued)

FOREIGN PATENT DOCUMENTS

EP    1 998 171 A2   12/2008
EP    2 458 375 A1    5/2012
(Continued)

OTHER PUBLICATIONS

"Flexible electronics—Wikipedia," dated Jul. 14, 2017, retrieved from the Internet URL: https://web.archive.org/web/20170714173644/ https://en.wikipedia.org/wiki/Flexible_electronics, pp. 1-7.
(Continued)

*Primary Examiner* — Vincent Q Nguyen
(74) *Attorney, Agent, or Firm* — Alston & Bird LLP (57) ABSTRACT

Embodiments relate generally to systems and methods for a low profile PID typically including a flexible substrate; two or more electrodes containing an array of holes; a spacer with one or more holes; and two or more contacts corresponding to the electrodes. Typically, the unfolded flexible substrate defines a plane, and the electrodes are disposed on the flexible substrate such that when the flexible substrate is folded, one electrode is located on a top plane and another electrode is located on a bottom plane and the spacer is disposed between the electrodes to form an ionization chamber for use with a UV radiation source.

18 Claims, 6 Drawing Sheets

(56) References Cited

U.S. PATENT DOCUMENTS

2009/0115423 A1    5/2009  Stockdale et al.
2012/0136268 A1    5/2012  Li et al.
2015/0189736 A1    7/2015  Yang et al.

FOREIGN PATENT DOCUMENTS

JP    2016-039337 A    3/2016
KR    10-1694529 B1    1/2017
WO    2011/008043 A2   1/2011

OTHER PUBLICATIONS

International Search Report of the International Searching Authority for PCT/US2017/062483 dated May 3, 2018.
Communication Pursuant to Rules 161(1) and 162 for European Patent Application No. 17808712.8 dated Jul. 3, 2020, 3 pages.

* cited by examiner

LOW PROFILE IONIZATION DETECTOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A photoionization detector (PID) can be used to detect the presence and concentration of toxic gases, such as volatile organic compounds (VOCs), present in the surrounding atmosphere which can pose a threat to humans. The PID can measure VOCs in low concentrations from parts per million (ppm) down to the parts per billion (ppb). A PID is a very sensitive broad-spectrum monitor.

For example, a PID might be used in a PID employs an ultraviolet (UV) lamp to emit photons that ionize target gases in the proximity of detector electrodes. An electric field is established between the plates of the electrodes by an applied voltage bias. The electric field induces ionized particles to move to one or another plate, thereby establishing an electric current between the electrodes. The electric current can be processed to provide an indication of the presence of one or more ionizable gases. The gases break down into positive and negative ions that are measured with an ionization detector. Ionization occurs when a molecule absorbs the high-energy UV light, which excites the molecule and results in the temporary loss of a negatively charged electron and the formation of positively charged ion. The gas becomes electrically charged. In the PID, the charged particles produce a current that is amplified and converted to (or related to) a concentration measurement, and displayed on the meter as "ppm" or "ppb" or another concentration measurement. The ions recombine after passing the electrodes in the ionization detector to re-form the original molecule. PIDs are non-destructive; they do not "burn" or permanently alter the sample gas, which allows them to be used for sample gathering. The ionization detector (e.g. PID) plays an important role in the performance of the PID sensor, affecting accuracy and linearity.

SUMMARY

In an embodiment, a low profile PID sensor may comprise an ultraviolet radiation source; a flexible substrate; two or more electrodes containing an array of holes (which typically pass through the flexible substrate as well); a spacer with one or more holes; and one or more contacts; wherein the (unfolded) flexible substrate defines a plane, and wherein the electrodes are disposed on the surface of the flexible substrate such that when the flexible substrate is folded, one electrode is located on a top (or first) plane and another electrode is located on a (separate, different) bottom (or second) plane and the spacer is disposed between the electrodes.

In an embodiment, a method of manufacturing a low profile PID may comprise printing (e.g. a pattern of electrode material to form) two or more electrodes and corresponding contacts onto a (flat, planar) flexible substrate (when the flexible substrate is in the unfolded configuration), wherein the pattern of the electrodes may contain an array of holes; folding the flexible substrate such that when the flexible substrate is folded one electrode is located on a top (or first) plane and another electrode is located on a (separate, different) bottom (or second) plane; inserting a spacer in the plane parallel between the top plane and bottom plane of the folded flexible substrate; bonding the spacer to the folded flexible substrate; and assembling the folded flexible substrate into a sensor module containing an ultraviolet radiation source.

In an embodiment, a low profile photoionization detector assembly for use with a low profile photoionization detector may comprise a bias electrode; a sensing electrode; a guard electrode; one or more contacts; a spacer; and a flexible substrate; wherein the guard electrode is configured to surround the sensing electrode, and wherein the bias electrode, sensing electrode, guard electrode, and the one or more (corresponding) contacts are printed onto the (flat, planar) flexible substrate (when in unfolded configuration and wherein the flexible substrate is configured to be folded such that when folded, the sensing electrode and guard electrode are disposed on one (e.g. a first) plane and the bias electrode is disposed on a separate/different plane (e.g. a second plane).

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet n existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include ionization detectors (e.g. PIDs), PID sensors and/or assemblies, and systems and methods of manufacturing a PID) and/or PID sensor/assembly using a flexible substrate comprising electrodes and contacts located on (for example, printed on) the flexible substrate (where the flexible substrate may be similar to flexible printed circuits ("FPC")). Disclosed ionization detectors (e.g. PID) may include a flexible substrate, (which initially may be flat/planar during construction of the PID but later is) folded to span a first or top plane and a second or bottom plane (which is different from and typically may be parallel to the first/top plane); two or more electrodes (and typically also their corresponding contacts)(e.g. all located on the flexible substrate (e.g. printed on the flexible substrate); and a spacer (typically insulating); wherein a first of the two or more electrodes may be located on a first/top plane, a second of the two or more electrodes may be located on a second/bottom plane (e.g. parallel to the first plane), and a spacer is disposed/located between the first and second electrodes; wherein the spacer comprises one or more holes/apertures; and wherein each of the first and second electrodes comprises one or more and typically a plurality of holes/apertures in an array) which pass through the flexible substrate (as well as the electrode material). Typically, the electrodes may be printed onto one or more surface of the flexible substrate when the flexible substrate at least the portion of the flexible substrate with the electrodes) is not folded but is ion a flat, planar, or unfolded state. After printing (or otherwise forming or attaching) the electrodes onto the flexible substrate, the flexible substrate would be folded so that a first electrode would be located in a top/first plane and the second electrode would be located in a bottom/second plane, with the spacer located therebetween. This configuration forms an ionization chamber between the electrodes, typically having a thickness based on the spacer. Typically, the first electrode would be a bias electrode, and the second electrode would be a sensing electrode. In some embodiments, the PID might further include a third electrode. For example, the third electrode might be a guard electrode located on the same plane with the second/sensing electrode, typically with the guard electrode (at least partially) surrounding the sensing electrode. For example, the guard electrode might comprise a ring surrounding the bias electrode. Thus, the guard electrode for disclosed embodiments typically would not be located on a different plane from the sensing electrode and/or would not be located between the sensing and bias electrodes. Typically, the bias electrode and the sensing electrode would include one or more (and typically a plurality or array of) holes/apertures (which typically also pass through the underlying flexible substrate on which the electrode is formed), while the guard may not include any holes/apertures (e.g. through the flexible substrate). Some embodiments might include PID sensors/assemblies with a disclosed PID. Such PID sensors/assemblies might further comprise (in addition to the PID with folded substrate) a UV radiation source (which for example might be directed to project UV light into the ionization chamber, for example through the holes/apertures in the bias electrode). So a typical disclosed PID configuration might have the bias electrode located proximal to the UV radiation source and the sensing electrode located distal to the UV radiation source, with the bias electrode configured so that the UV light enters the ionization chamber through the holes and the gas sample may enter the ionization chamber through the holes/apertures in the sensing electrode. Such embodiments with a flexible substrate may allow for a smaller assembly that includes the electrodes and contacts when compared to typical PIDs. Additionally, by reducing the number of components in the PID, the PID can be made much smaller compared to existing PIDs, the assembly and manufacturing process can be simplified and the cost of the PID can be lowered.

Embodiments of the disclosure include a method of manufacturing a PID that may comprise forming an FPC with two or more electrodes (and typically also with their corresponding contacts/contactors) (e.g. with the electrodes located on a flexible substrate), folding the initially planar FPC so that the first electrode is located in a different (typically substantially parallel) plane from the second electrode, inserting a spacer between the folded FPC (e.g. between the two planes with different electrodes), and/or boding the spacer to the (folded) FPC. Forming an FPC may comprise forming (which might include attaching or printing) electrodes onto a flexible substrate. Forming the FPC might include forming a sensing electrode and a bias electrode on a flexible substrate, surrounding a sensing electrode with a guard electrode on the same plane and placing the biasing electrode on a separate plane (e.g. by folding the flexible substrate). This layout may prevent positive ions from being trapped on the guard electrode which can cause errors in measurement. Embodiments of the disclosure may also comprise a system where the sensing electrode and bias electrode may be placed closer together (than in a typical PID), thereby minimizing the interference of humidity and condensation in the measurement, which can cause false alarms, decay of the electrodes, and a spike in the current.

Figure 1A:
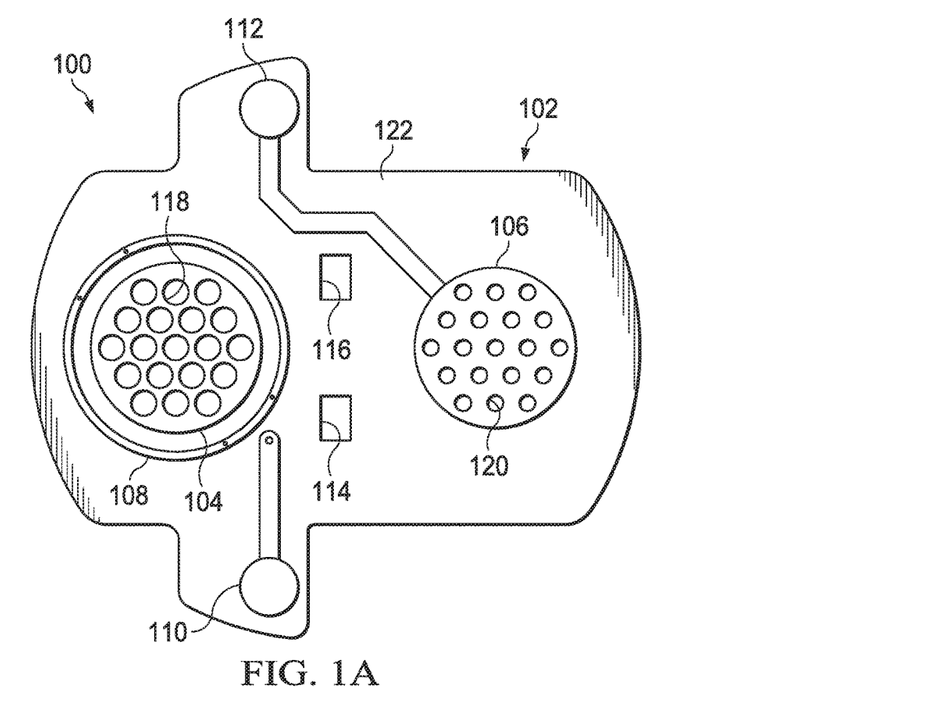
FIG. 1A illustrates a perspective view of an unfolded PID according to an embodiment.

Turning now to FIG. 1A-3, an exemplary low profile PID 100 is shown. FIGS. 1A-1B show the PID 100 in unfolded configuration (without spacer, while FIG. 2 further shows the spacer) In FIG. 1A, the low profile PID 100 may comprise a flexible substrate 102 that makes up the base material and acts as insulation and/or support for one or more other elements of the PID 100. In some embodiments, the flexible substrate 102 may comprise a flexible material such as a fluorinated polymer (e.g., PTFE, etc.), sold commercially as TEFLON™. Other insulating, heat resistant and low gas adsorbing flexible substrates 102 may be used, for example, fluorinated ethylene propylene (FEY), perfluoroalkoxy alkane (PFA), polyimide, polyester, and/or a combination thereof. FIG. 1A shows a first side 122 of the PID 100 in unfolded configuration that, once folded, would typically become the inside of the low profile PID 100. The thickness of flexible substrate 102 can range anywhere between approximately 0.1 millimeters (mm) to approximately 0.2 mm. In an embodiment, multiple layers of flexible substrate 102 can be used (for example, instead of folding a single layer, two separate layers of flexible substrate (each with at least one electrode) could be used.

In some embodiments, the low profile PID 100 may comprise two or more electrodes, such as a sensing electrode 104, a bias electrode 106, and a guard electrode 108. The PID 100, with electrodes formed on or attached to the flexible substrate, may comprise a flexible printed circuit board ("FPC"). Generally, a flexible printed circuit board is a bendable board based on a thin insulating film on which a circuit pattern (e.g. electrodes and/or contacts) is formed. Typically, a flexible printed circuit board may be manufactured by etching a copper foil laminated on a flexible insulation material, and/or by printing conductive paste or ink into a circuit pattern on an insulation material (e.g. a flexible substrate) and then plating the circuit pattern. In one embodiment, the one or more electrodes 104, 106, and 108 are made by printing the electrode circuit pattern onto the flexible substrate 102 using copper coated with gold. Other conductive materials may be used in place of copper, such as gold, hastelloy, and the like. The gold coating is inert to ozone which reduces decay of the electrode. In another embodiment, the one or more electrodes 104, 106, and 108 are made by printing the electrode circuit pattern onto the flexible substrate 102 on both the first side 122 of the flexible substrate 102 and a second side 124 of the flexible substrate 102 (shown in FIG. 1B). Typically, the sensing and bias electrodes might be similar in size and/or positioned when the flexible substrate is in folded configuration so that they substantially overlap.

In an embodiment, the sensing electrode 104 may be printed onto the flexible substrate 102 in a pattern that contains one or more (e.g. an array of) holes 118 that extend through the flexible substrate 102 from the first side 122 to the second side 124. In an embodiment, the bias electrode 106 may be printed on the flexible substrate 102 in a pattern that contains one or more (e.g. an array of) holes 120 that extend through the flexible substrate 102 from the first side 122 to the second side 124. In other words, the holes in the sensing and bias electrodes (104, 106) typically pass through the underlying flexible substrate 102 (e.g. the holes may be pre-formed in the flexible substrate, such that formation of the electrodes may occur with matching holes through the electrode and the substrate). In embodiments having one or more electrode formed on both the first and second sides of the flexible substrate 102 (when unfolded), typically such electrode would include a metallized layer on both the first and second sides of the flexible substrate, with the metallized patterns/layers on the first and second sides in conduction through metallized holes (e.g. the electrode material forming the metallized layers may also span the sidewalls of the holes in the electrode and/or substrate to electrically connect the first and second sides of the same electrode into an electrically unitary whole). In some embodiments, one or more of the electrodes might be formed/located on only one side/surface of the flexible substrate 102. In the embodiment shown in FIGS. 1A-1B, the diameter of the holes 118 in the sensing electrode 104 is larger than the diameter of the holes 120 in the bias electrode 106. In some embodiments, the locations of the holes in the sensing electrode may match/align with the holes in the bias electrode when the flexible substrate is in its folded configuration. The combined open surface area of all holes in the bias electrode 106 may depend on the hole diameter and the minimum distance between the holes. In some embodiments, the diameter of the holes 120 in the bias electrode is 0.5 mm and the distance between the holes 120 is approximately 0.5 mm or larger. The combined open surface area of all holes in the sensing electrode 104 may depend on the hole diameter and the minimum distance between the holes. In some embodiments, the diameter of the holes 118 is 0.8 mm and the distance between the holes 118 is approximately 0.2 mm or larger.

In an embodiment, the guard electrode 108 may be placed/located around and/or encircling the sensing electrode 104 to collect the leakage current from the bias electrode 106 and to prevent interference in the electric field distribution between the sensing electrode 104 and the bias electrode 106. Further, the potential of the guard electrode 108 may be set and maintained at or near the potential of the sensing electrode 104. Accordingly, the guard electrode 108 can trap charge movement (that may be associated with condensation) from the bias electrode 106 to the sensing electrode 104. Trapping the charge movement associated with condensation may prevent false alarms and improves accuracy of measurements at conditions of high humidity.

Figure 1B:
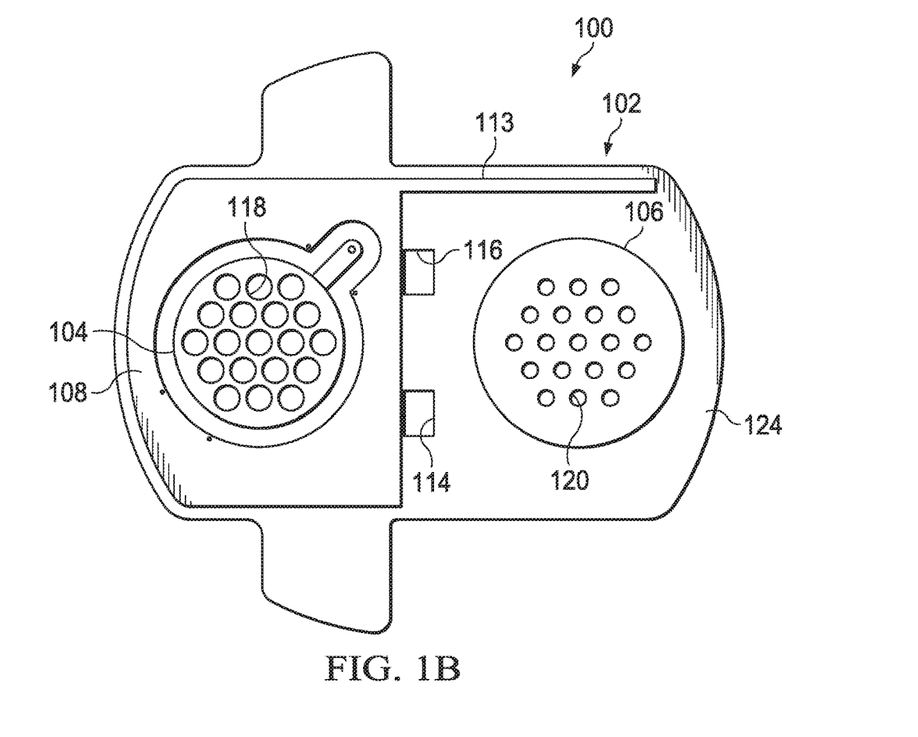
FIG. 1B illustrates a perspective view of an unfolded PID according to an embodiment.

FIG. 1A also shows an embodiment of the PID 100 comprising one or more contacts 110, 112, and 113 (shown in FIG. 1B). Contact 110 may be associated with the sensing electrode 104, contact 112 may be associated with the bias electrode 106, and contact 113 may be associated with the guard electrode 108. The contacts 110, 112, and 113 may be configured to communicate electric signals to/from the electrodes 104, 106, and 108. In some embodiments, the flexible substrate 102 may contain slots 114 and 116 to assist with the folding of the low profile PID 100.

FIG. 1B shows an embodiment of a low profile PID 100 showing the second side 124 of the PID. Once the low profile PID 100 is folded, the second side 124 would typically become the outside of the low profile PID 100 (e.g. with one electrode located on a first/top plane and another electrode located on a second/bottom plane).

Figure 2:
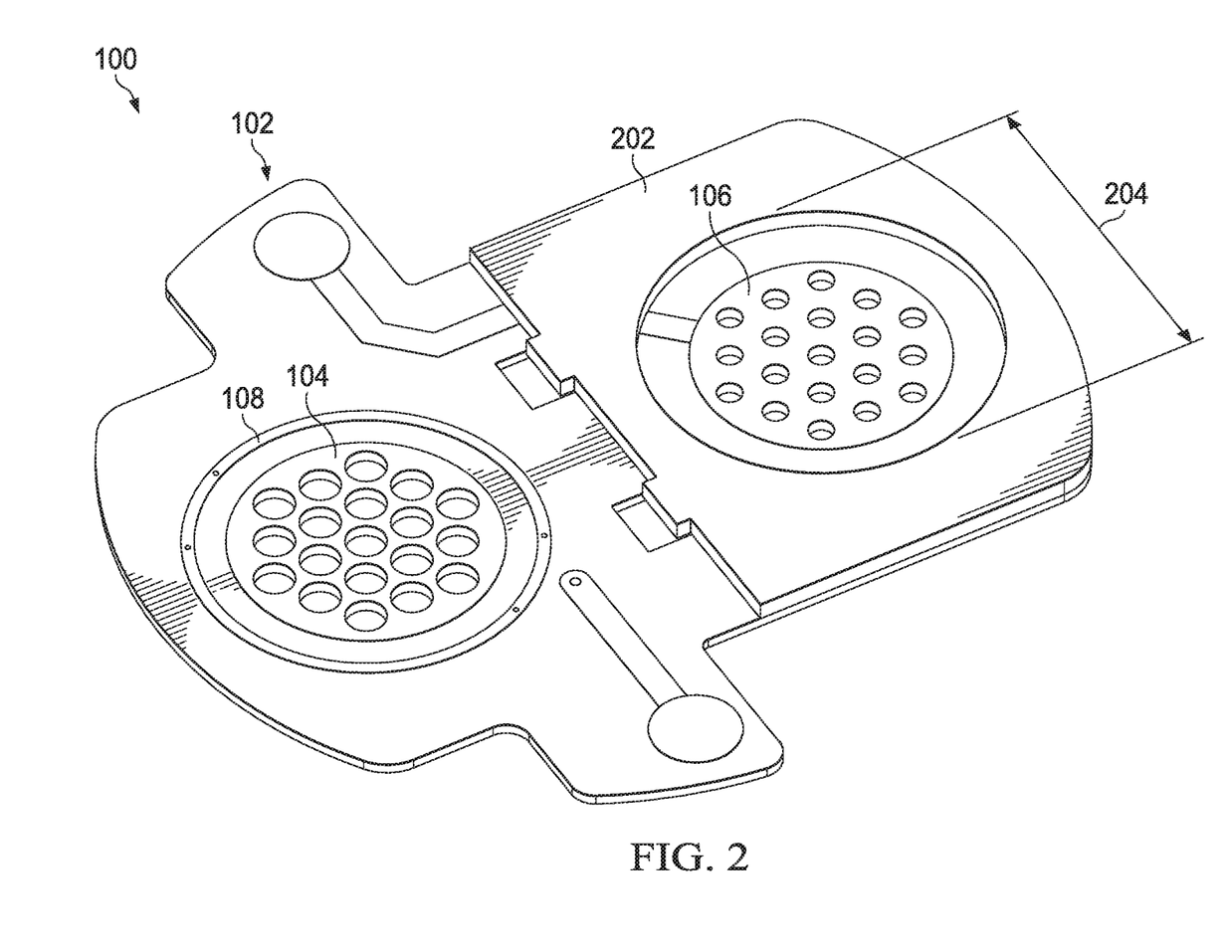
FIG. 2 illustrates a perspective view of an unfolded PID according to an embodiment.

FIG. 2 illustrates an embodiment of the low profile PID 100 (in unfolded configuration, e.g. during manufacture/construction) further comprising a spacer 202. The spacer 202 may be placed atop a portion of the flexible substrate having either the sensing electrode 104 or bias electrode 106, so that when the flexible substrate is folded, the spacer would be located in a plane between (and typically substantially parallel to) the sensing and bias electrodes (which typically also would be substantially parallel to each other). The spacer 202 may comprise an insulating material such as a fluorinated polymer (e.g., PTFE, etc.), sold commercially as TEFLON™, fluorinated ethylene propylene (FEP), perfluoroalkoxy alkane (PEA), polyimide, polyester, or the like. The maximum thickness or height of the spacer 202 may be approximately 2 mm. The minimum thickness or height of the spacer 202 may be approximately 0.2 mm. Thus, for example, the spacer may have a thickness of 0.2-0.5 mm, 0.2-0.7 mm, 0.2-1 mm, 0.2-1.2 mm, 0.2-1.5 mm, 0.2-1.7 mm, 0.2-7 mm, 0.5-1 mm, 0.5-1.5 mm, 0.5-2 mm. 1-1.2 mm, or 1-1.5 mm. The spacer 202 may contain one or more holes 204 to allow gas flow through the spacer 202 (i.e., between the electrodes 104 and 106) to form the ionization chamber between the electrodes in folded configuration. In the embodiment of FIG. 2, the spacer comprises only one hole 204, and the diameter of the hole 204 in the spacer 202 may be slightly larger than the inside diameter of the guard electrode 108. When assembled, the spacer 202, the sensing electrode 104, the bias electrode 106, and the guard electrode 108 form an ionization chamber of the low profile PID 100, which is described in more detail below.

Figure 3A:
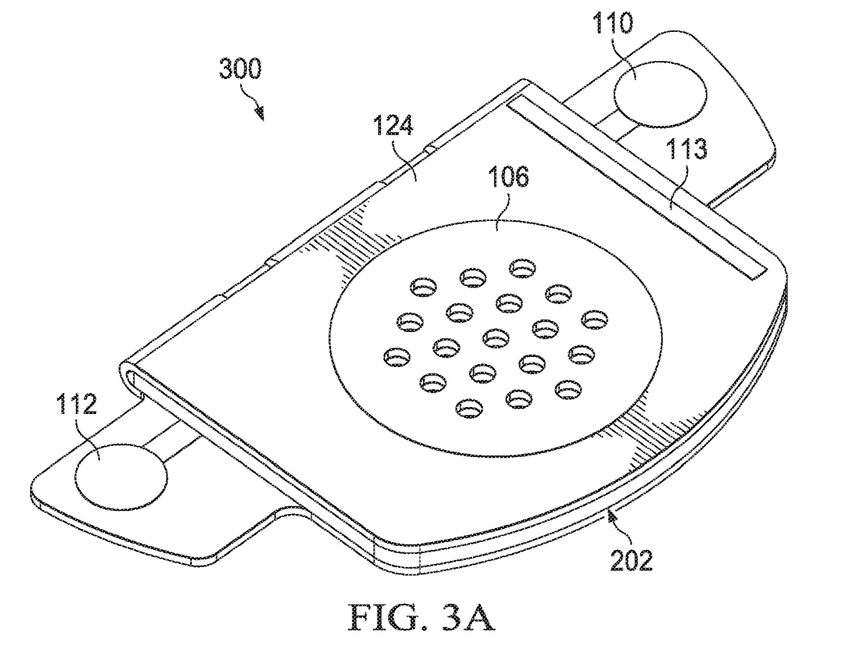
FIG. 3A illustrates a perspective view of a folded PID according to an embodiment.
Figure 3B:
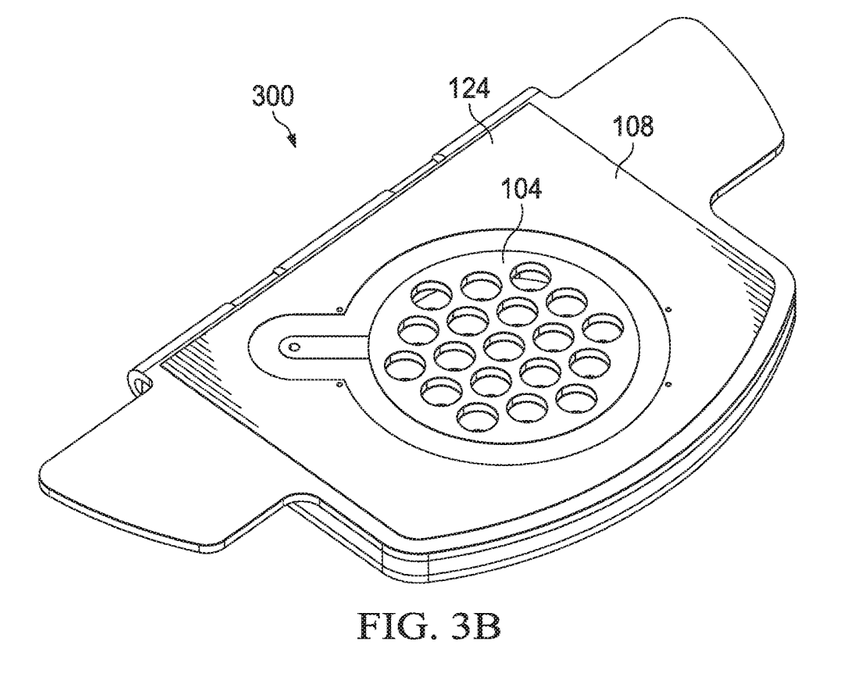
FIG. 3B illustrates a perspective view of a folded PID according to an embodiment.

FIG. 3A illustrates the low profile PID 100 described above, where the flexible substrate 102 has been folded, forming folded low profile PID 300 (e.g. ready for use in a sensor/assembly). The second side 124 is shown with the bias electrode 106 on the top. Contacts 110 and 112 are also seen facing upward. FIG. 3B shows the reverse of the folded low profile PID 300 of FIG. 3A according to an embodiment of the disclosure. Second side 124 is shown now with the sensing electrode 104 and guard electrode 108 on top (e.g. the reverse of the folded PID shown in FIG. 3A). In FIGS. 3A-B, the spacer is sandwiched between the folded flexible substrate top and bottom planes.

Figure 4A:
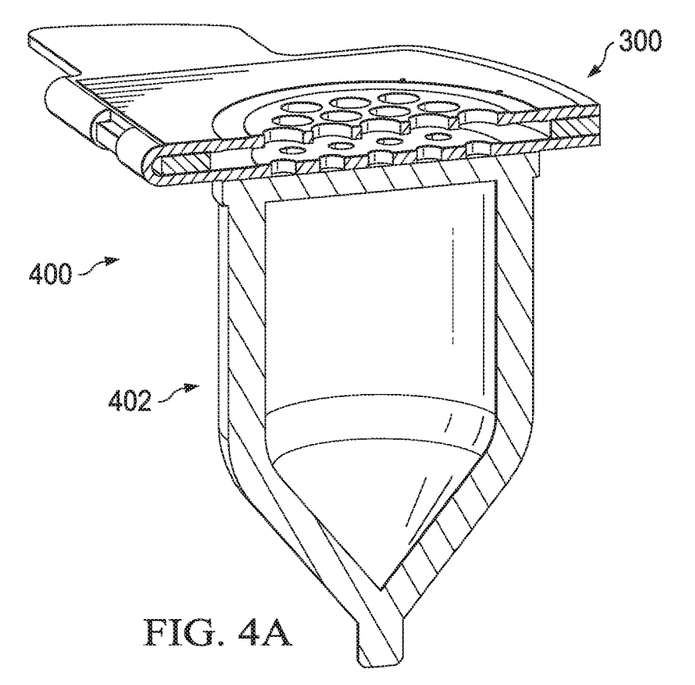
FIG. 4A illustrates a cross sectional view of a folded PID according to an embodiment.
Figure 4B:
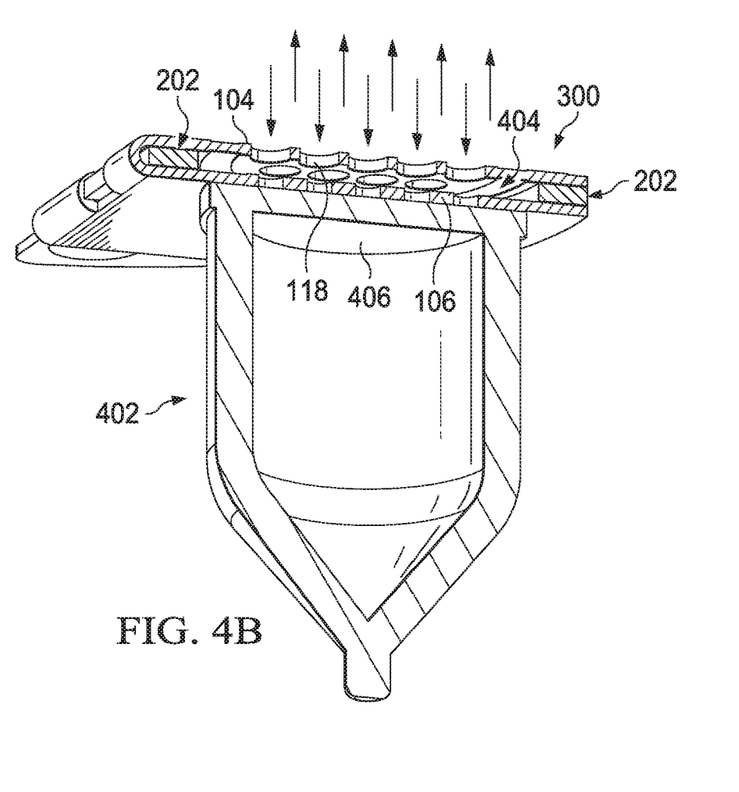
FIG. 4B illustrates a cross sectional view of a folded PID according to an embodiment.

Turning to FIGS. 4A-4B, cross-sectional views of a folded low profile PID 300 are shown, where the folded low profile PID 300 is connected to an ultraviolet radiation source, shown as UV lamp 402, to form a PID sensor/assembly 400. UV lamp 402 is configured to act as a light source and generate light and/or radiation. In other embodiments, the PID sensor 400 may comprise another or different light source. While described as light, the radiation may or may not be in the visible spectrum. In general, the radiation can be selected to ionize one or more gasses of interest (e.g., target gas(es)) where the wavelength or wavelength range of the radiation may be suitable for ionizing the target gas(es). The UV lamp 402 may function as a UV light source for the PID sensor 400. In some embodiments, the UV lamp 402 may produce vacuum ultraviolet (VUV) radiation. In some embodiments, the UV lamp 402 may comprise one or more noble gasses sealed inside the UV lamp 402. Typically, the folded PID 300 is oriented/configured in the sensor 400 so that the bias electrode 106 is proximal to the UV lamp 402, while the sensing electrode 104 and guard electrode 108 are distal to the UV lamp, and the UV lamp 402 would be configured/oriented to project UV light into the ionization chamber through the holes in the bias electrode 106. Typically, the sensing electrode 104 of the folded PID 300 would be oriented/configured in the sensor 400 so that a gas sample (e.g. the gas sample to be tested/detected by the PID sensor) enter the ionization chamber through the holes 118 in the sensing electrode 104.

As shown in FIG. 4B, in operation gas enters the low profile PID 300 through the holes 118 of the sensing electrode 104, which is located on the top plane of the low profile PID 300 when folded. The gas enters through the holes 118 and into the space between the top plane containing the sensing electrode 104 and the bottom plane containing the bias electrode 106 of the folded low profile PID 300, which is enclosed by the spacer 202 to form the ionization chamber 404.

In some embodiments, the distance between the sensing electrode 104 and bias electrode 106 when folded (Which may also represent the height of the ionization chamber and the height of the spacer 202) may range from a maximum height of approximately 2 mm to a minimum height of approximately 0.2 mm. In alternative embodiments, the distance between the sensing electrode 104 and bias electrode 106 when folded may comprise any height between approximately 0.2 mm to 2 mm.

Figure 5A:
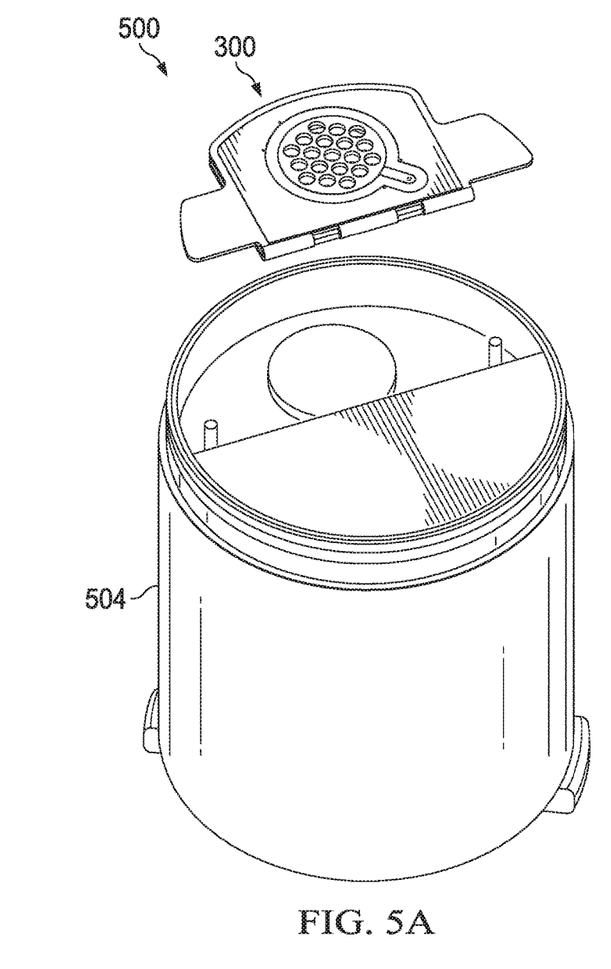
FIG. 5A illustrates a perspective view of a PID according to an embodiment.
Figure 5B:
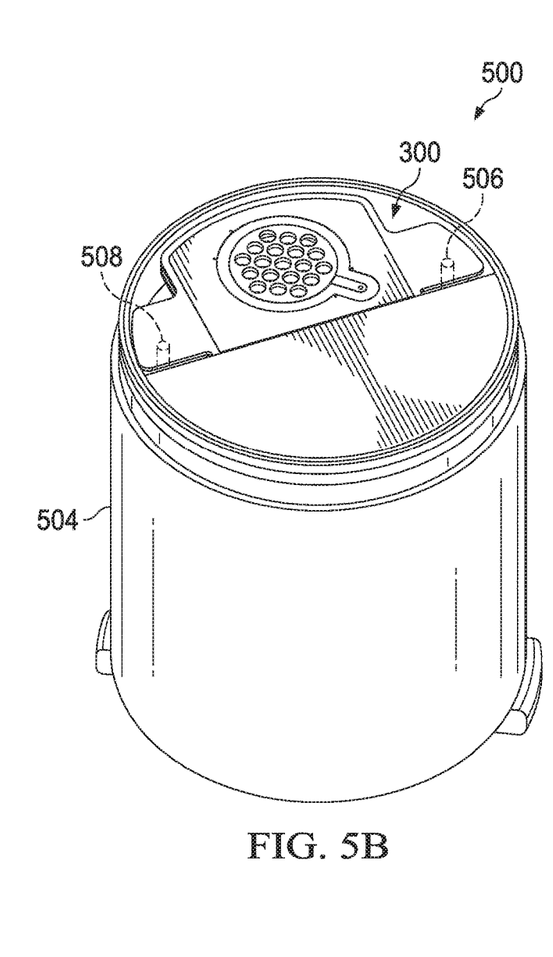
FIG. 5B illustrates a perspective view of a PID according to an embodiment.

Turning to FIG. 5A, a low profile PID system 500 is shown according to an embodiment. The folded low profile PID 300 is shown prior to being assembled with a PID sensor module 504 (which may contain electrical connectors/pins/contacts and/or a UV lamp 402). FIG. 5B shows, according to an embodiment, the assembled low profile PID system 500. The folded low profile PID 300 may be placed into the PID sensor module 504 in the orientation shown in FIGS. 5A and 5B. Contact 112 (shown in FIG. 3A) associated with bias electrode 106 may be connected to a high voltage DC output pin 508 on the PID sensor module 504. Contact 110 (shown in FIG. 3A) associated with the sensing electrode 104 may be connected to an amplifier input pin 506 on the PID sensor module 504. The potential of the guard electrode 108 may be set near to or the same as the potential of the sensing electrode 104 (via the contact 113 of the guard electrode 108).

In an embodiment, the PID sensor module 504 may also contain a ITV lamp 402. A high voltage may be applied (from AC 500V 100 k Hz to AC 2500V 100 k Hz) to the UV lamp 402 and UV light generated inside the lamp 402 passes through the crystal window 406 (see FIG. 4B) and through the holes 120 of the bias electrode into the ionization chamber 404. During use, gas inside the ionization chamber 404 may absorb the energy of the UV light and be ionized into charged ions. The charged ions move within the electric field between the bias electrode 106 and the sensing electrode 104 and a signal may be detected as a current and/or potential difference between the electrodes 104 and 106. The sensing electrode 104 collects the electrical signal which is amplified by the PID sensor module 500 and transmitted to a display portion of the PID sensor module 500 for reading the gas concentration. The working temperature range of the PID sensor module 500 may be between −20° C. to 65° C.

Figure 6:
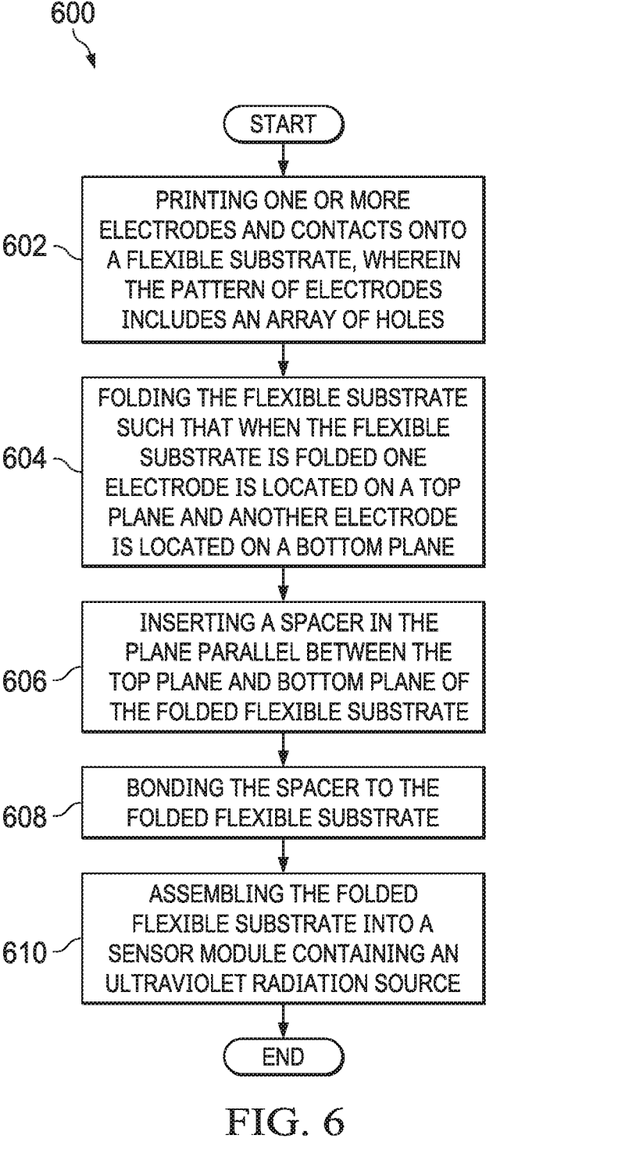
FIG. 6 illustrates a method of manufacturing a PID according to an embodiment.

In FIG. 6, an exemplary method of manufacturing a low profile PID 600 is described. At block 602, two or more electrodes 104 and 106 and related/corresponding contacts 110 and 112 may be printed on (or otherwise formed on or attached to) the flexible substrate 102 (e.g. forming a flexible printed circuit with electrodes on a flexible substrate). In some embodiments, three electrodes might be printed/formed/attached on the flexible substrate 102, with a sensing electrode 104, a guard electrode 108, and a bias electrode 106, and with the guard electrode 108 located around (e.g. encircling or surrounding) the sensing electrode 104. The pattern of the electrodes 104 and 106 in FIG. 6 are printed to contain an array of holes 118 and 120 (which typically pass through the underlying flexible substrate as well, for example for the sensing and bias electrodes). In some embodiments having a guard electrode, the guard electrode 108 might not have any such holes). So for example, printing might result in an unfolded PID similar to FIGS. 1A-1B. At block 604, the flexible substrate 102 would be folded (e.g. in half) such that when the flexible substrate 102 is folded, one electrode (e.g. sensing electrode 104) is located on a top plane and another electrode (e.g. bias electrode 106) is located on a bottom plane (and in some embodiments, the third electrode—guard electrode 108—might also be located on the top plane (for example in the same plane as the sensing electrode) e.g. forming a folded PID 300 similar to FIGS. 3A-B). At block 606, a spacer 202 may be inserted between the top and bottom planes of the folded flexible substrate 102 (which might result in an unfolded PID similar to FIG. 2, or a folded PID similar to FIGS. 3A-B (with spacer sandwiched between the folded flexible substrate top and bottom planes)). At block 608, the spacer 202 may be bonded to the flexible substrate, e.g. with a heat resistant adhesive. Finally at block 610, the folded low profile PID 300 may be inserted (e.g. assembled) into a PID sensor module 504 containing an ultraviolet radiation source 402

(e.g. with the bias electrode oriented proximal to the UV lamp and the sensing electrode oriented distal the UV lamp, similar to FIGS. 4A-5B). This could further include orienting the folded PID 300 with respect to the radiation source (e.g. UV lamp 402) and/or the gas sample, and/or directing the radiation source (e.g. UV lamp 402) towards the holes in the bias electrode of the folded PID 300. Additionally, the PID 300 could be electrically connected in the sensor module via the contacts, for example with the contact of the bias electrode connecting to a high voltage DC output pin on the sensor module and the contact of the sensing electrode connecting to the amplifier input pin on the sensor module.

Having described various devices and methods herein, exemplary embodiments or aspects can include, but are not limited to:

In a first embodiment, a low profile PID may comprise an ultraviolet radiation source; a flexible substrate; two or more electrodes containing an array of holes; a spacer with one or more holes; and one or more contacts; wherein the flexible substrate defines a plane, and wherein the electrodes are disposed on the surface of the flexible substrate such that when the flexible substrate is folded, one electrode is located on a top plane and another electrode is located on a bottom plane and the spacer is disposed between the electrodes.

A second embodiment can include the low profile PID of the first embodiment, wherein multiple layers of flexible substrate are used, each with at least one electrode.

A third embodiment can include the low profile PID of the first or second embodiment, wherein the flexible substrate contains a sensing electrode, a bias electrode, and a guard electrode.

A fourth embodiment can include the low profile PID of any of the first to third embodiments, wherein the PID with electrodes formed on or attached to the flexible substrate may comprise a flexible printed circuit board.

A fifth embodiment can include the low profile PID of any of the first to fourth embodiments, wherein the electrodes are made by printing the electrode circuit pattern onto the flexible substrate using copper coated with gold.

A sixth embodiment can include the low profile PID of any of the first to fifth embodiments, wherein the electrodes are made by printing the electrode circuit pattern onto the flexible substrate on both the first side of the flexible substrate and the second side of the flexible substrate.

A seventh embodiment can include the low profile PID of any of the first to sixth embodiments, wherein the guard electrode surrounds the sensing electrode and is configured to collect leakage current from the bias electrode.

An eighth embodiment can include the low profile PID of any of the first to seventh embodiments, wherein the sensing electrode, the bias electrode, and the guard electrode are disposed on the flexible substrate such that, when the flexible substrate is folded, the sensing electrode and the guard electrode are located on the top plane and the bias electrode is located on the bottom plane, and wherein the bias electrode is proximal to the ultraviolet radiation source, the sensing electrode is distal to the ultraviolet radiation source, and the ultraviolet radiation source is configured to direct light towards the holes in the bias electrode.

A ninth embodiment can include the low profile PID of any of the first to eighth embodiments, wherein when the flexible substrate is folded, the distance between the sensing electrode and the bias electrode is less than 2 mm.

A tenth embodiment can include the low profile PID of any of the first to ninth embodiments, wherein the bias electrode may be printed on the flexible substrate in a pattern that contains one or more holes that extend through the flexible substrate from the first to the second side.

An eleventh embodiment can include the low profile PID of any of the first to tenth embodiments, wherein the sensing electrode may be printed on the flexible substrate in a pattern that contains one or more holes that extend through the flexible substrate from the first to the second side.

A twelfth embodiment can include the low profile PID of any of the first to eleventh embodiments, wherein the guard electrode may be printed on the flexible substrate in a pattern that contains one or more holes that extend through the flexible substrate from the first to the second side.

A thirteenth embodiment can include the low profile PID of any of the first to twelfth embodiments, wherein electrodes that are formed on both the first and second sides of the flexible substrate include a metallized layer on both the first and second sides of the flexible substrate and wherein the metallized layers span the sidewalls of the holes on the electrode and/or substrate to electrically connect/conduct the first and second sides of the same electrode into an electrically unitary whole.

A fourteenth embodiment can include the low profile PID of any of the first to thirteenth embodiments, wherein the diameter of the holes of the sensing electrode are larger than the diameter of the holes of the bias electrode.

A fifteenth embodiment can include the low profile PID of any of the first to fourteenth embodiments, wherein the diameter of the hole in the spacer is larger than the inside diameter of the guard electrode.

A sixteenth embodiment can include the low profile PID of any of the first to fifteenth embodiments, wherein the location of the holes in the sensing electrode may match/align with the location of the holes in the bias electrode when the flexible substrate is in a folded configuration.

A seventeenth embodiment can include the low profile PID of any of the first to sixteenth embodiments, wherein the spacer, the sensing electrode, the bias electrode, and the guard electrode form an ionization chamber.

An eighteenth embodiment can include the low profile PID of any of the first to seventeenth embodiments, wherein the low profile PID in an unfolded configuration comprises a spacer and wherein the spacer may be placed atop a portion of the flexible substrate having either the sensing electrode or bias electrode, so that when the flexible substrate is folded, the space would be located in a place between the sensing and bias electrodes.

A nineteenth embodiment can include the low profile PID of any of the first through eighteenth embodiments, wherein the flexible substrate comprises polytetrafluoroethylene (PTFE).

A twentieth embodiment can include the low profile PID of any of the first through nineteenth embodiments, wherein the spacer comprises polytetrafluoroethylene (PTFE).

A twenty-first embodiment can include the low profile PID of any of the first through twentieth embodiments, wherein the spacer may have a maximum thickness of approximately 2 mm.

A twenty-second embodiment can include the low profile PID of any of the first through twenty-first embodiments, wherein the spacer may have a minimum thickness of approximately 0.2 mm.

A twenty-third embodiment can include the low profile PID of any of the first through twenty-second embodiments, wherein the electrodes and contacts comprise a flexible printed circuit consisting of copper coated with gold.

A twenty-fourth embodiment can include the low profile PID of any of the first through twenty-third embodiments, wherein the contacts are connected to a high voltage DC power source and amplifier.

A twenty-fifth embodiment can include the low profile PID of any of the first through twenty-fourth embodiments, wherein the folded PID is oriented in the sensor so that the bias electrode is proximal to the UV lamp, the sensing electrode and guard electrode are distal to the UV lamp, and the UV lamp is configured/oriented to project UV light e ionization chamber through the holes in the bias electrode.

A twenty-sixth embodiment can include the low profile PID of any of the first through twenty-fifth embodiments, wherein the sensing electrode of the folded PID is configured/oriented in the sensor so that a gas sample may enter the ionization chamber through the holes in the sensing electrode.

In a twenty-seventh embodiment, a method for manufacturing a low profile PID sensor may comprise printing two or more electrodes and contacts onto a flexible substrate, wherein two of the electrodes include an array of holes which pass through the flexible substrate; folding the flexible substrate such that, when the flexible substrate is folded, one electrode is located on a top plane and another electrode is located on a bottom plane; inserting a spacer in a parallel plane between the top plane and bottom plane of the folded flexible substrate; and bonding the spacer to the folded flexible substrate.

A twenty-eighth embodiment can include the method of the twenty-seventh embodiment, wherein three electrodes might be printed/formed/attached on the flexible substrate, with a sensing electrode, a guard electrode, and a bias electrode, and wherein the guard electrode is located around or encircles the sensing electrode.

A twenty-ninth embodiment can include the method of either the twenty seventh or the twenty-eighth embodiment, wherein printing the two or more electrodes comprises printing a bias electrode and corresponding contact to the flexible substrate; printing a sensing electrode and corresponding contact to the flexible substrate; printing a guard electrode to the flexible substrate; and wherein folding the flexible substrate comprises folding the flexible substrate such that when the flexible substrate is folded, the sensing electrode and the guard electrode are located on the top plane and the bias electrode is located on the bottom plane.

A thirtieth embodiment can include the method of any one of the twenty-seventh to twenty-ninth embodiments, wherein the pattern of the two or more electrodes are printed to contain an array of holes which typically pass through the underlying flexible substrate.

A thirty-first embodiment can include the method of any one of the twenty-seventh to thirtieth embodiments, wherein the folded low profile PID 300 may be inserted (e.g. assembled) into a sensor module containing an ultraviolet radiation source with the bias electrode oriented proximal to the UV lamp and the sensing electrode oriented distal the UV lamp and wherein the radiation source and/or the gas sample is directed towards the holes in the bias electrode of the folded PID.

A thirty-second embodiment can include can include the method of any one of the twenty-seventh to thirty-first embodiments, further comprising assembling the folded flexible substrate into a sensor module containing an ultraviolet radiation source; connecting the contact of the bias electrode to a high voltage DC output pin on the sensor module and connecting the contact of the sensing electrode to an amplifier input pin on the sensor module.

A thirty-third embodiment can include can include the method of any one of the twenty-seventh to thirty-second embodiments, wherein the sensing electrode and bias electrode are printed such that the diameter of the holes of the sensing electrode are larger than the holes of the bias electrode.

A thirty-fourth embodiment can include can include the method of any one of the twenty-seventh to thirty-third embodiments, wherein the flexible substrate is folded such that the distance between the top plane and the bottom plane is less than 2 mm.

In a thirty-fifth embodiment, a low profile PID assembly for use with a low profile PID, the low profile PID assembly comprising a bias electrode; a sensing electrode; a guard electrode; one or more contacts; a spacer; and a flexible substrate, wherein the guard electrode is configured to surround the sensing electrode; the bias electrode, the sensing electrode, the guard electrode, and the one or more contacts are printed onto the flexible substrate; and the flexible substrate is configured to be folded such that when folded, the sensing electrode and guard electrode are disposed on one plane and the bias electrode is disposed on a separate plane.

A thirty-sixth embodiment can include the low profile PID assembly of the thirty-fifth embodiment, wherein when the flexible substrate is folded, the distance between the sensing electrode and the bias electrode of the flexible substrate is less than 2 mm.

A thirty-seventh embodiment can include the low profile PID assembly of any one of the thirty-fifth or thirty-sixth embodiments, wherein the sensing electrode and the bias electrode are printed onto the flexible substrate with an array of holes.

A thirty-eighth embodiment can include the low profile PID assembly of any one of the thirty-fifth through thirty-seventh embodiments, wherein the sensing electrode and the bias electrode are printed such that the diameter of the holes of the sensing electrode is larger than the diameter of the holes of the bias electrode.

A thirty-ninth embodiment can include the low profile PID assembly of any one of the thirty-fifth through thirty-eighth embodiments, wherein the flexible substrate comprises polytetrafluoroethylene (PTFE).

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims Which follow that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure, Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A low profile photoionization detector comprising:
   an ultraviolet radiation source;
   a flexible substrate, wherein the flexible substrate contains a sensing electrode, a bias electrode, and a guard electrode, wherein the guard electrode surrounds the sensing electrode and is configured to collect leakage current from the bias electrode, and wherein each of two or more of the electrodes contain an array of holes;
   a spacer with one or more holes; and
   one or more contacts, each of the one or more contacts electrically connected to a corresponding one of the sensing electrode, the bias electrode, or the guard electrode,
   wherein the flexible substrate defines a plane, and wherein the electrodes are disposed on the flexible substrate such that, when the flexible substrate is folded, one electrode is located on a top plane and another electrode is located on a bottom plane and the spacer is disposed between the electrodes.

2. The low profile photoionization detector of claim 1, wherein the sensing electrode, the bias electrode, and the guard electrode are disposed on the flexible substrate such that, when the flexible substrate is folded, the sensing electrode and the guard electrode are located on the top plane and the bias electrode is located on the bottom plane; and wherein the bias electrode is proximal to the ultraviolet radiation source, the sensing electrode is distal to the ultraviolet radiation source, and the ultraviolet radiation source is configured to direct light towards the array of holes in the bias electrode.

3. The low profile photoionization detector of claim 1, wherein when the flexible substrate is folded, the distance between the sensing electrode and the bias electrode is less than 2 mm.

4. The low profile photoionization detector of claim 1, wherein diameters of the holes of the sensing electrode are larger than diameters of the holes of the bias electrode.

5. The low profile photoionization detector of claim 1, wherein a diameter of the one or more holes in the spacer is larger than an inside diameter of the guard electrode.

6. The low profile photoionization detector of claim 1, wherein the flexible substrate comprises polytetrafluoroethylene.

7. The low profile photoionization detector of claim 1, wherein the electrodes and the one or more contacts comprise a flexible printed circuit consisting of copper coated with gold.

8. The low profile photoionization detector of claim 1, wherein the one or more contacts are connected to a high voltage DC power source and amplifier.

9. A method of manufacturing a low profile photoionization detector sensor, the method comprising:
   printing a bias electrode and a corresponding contact onto a flexible substrate;
   printing a sensing electrode and corresponding contact onto the flexible substrate;
   printing a guard electrode onto the flexible substrate, wherein the guard electrode surrounds the sensing electrode and is configured to collect leakage current from the bias electrode, wherein each of two of the printed electrodes include an array of holes which pass through the flexible substrate, and wherein each of the corresponding contacts is electrically connected to the corresponding one of the sensing electrode or the bias electrode;
   folding the flexible substrate such that, when the flexible substrate is folded, one electrode is located on a top plane and another electrode is located on a bottom plane;
   inserting a spacer in a parallel plane between the top plane and the bottom plane of the folded flexible substrate; and
   bonding the spacer to the folded flexible substrate.

10. The method of claim 9,
    wherein folding the flexible substrate comprises folding the flexible substrate such that when the flexible substrate is folded, the sensing electrode and the guard electrode are located on the top plane and the bias electrode is located on the bottom plane.

11. The method of claim 10, further comprising:
assembling the folded flexible substrate into a sensor module containing an ultraviolet radiation source;
connecting the corresponding contact of the bias electrode to a high voltage DC output pin on the sensor module; and
connecting the corresponding contact of the sensing electrode to an amplifier input pin on the sensor module.

12. The method of claim 10, wherein the sensing electrode and the bias electrode are printed such that diameters of the holes of the sensing electrode are larger than diameters of the holes of the bias electrode.

13. The method of claim 9, wherein the flexible substrate is folded such that the distance between the top plane and the bottom plane is less than 2 mm.

14. A low profile photoionization detector assembly for use with a low profile photoionization detector, the low profile photoionization detector assembly comprising:
a bias electrode;
a sensing electrode;
a guard electrode;
one or more contacts, each of the one or more contacts electrically connected to a corresponding one of the sensing electrode, the bias electrode, or the guard electrode;
a spacer; and
a flexible substrate,
wherein:
the guard electrode surrounds the sensing electrode and is configured to collect leakage current from the bias electrode;
the bias electrode, the sensing electrode, the guard electrode, and the one or more contacts are printed onto the flexible substrate; and
the flexible substrate is configured to be folded such that when folded, the sensing electrode and the guard electrode are disposed on one plane and the bias electrode is disposed on a separate plane.

15. The low profile photoionization detector assembly of claim 14, wherein when the flexible substrate is folded, the distance between the sensing electrode and the bias electrode of the flexible substrate is less than 2 mm.

16. The low profile photoionization detector assembly of claim 14, wherein each of the sensing electrode and the bias electrode are printed onto the flexible substrate with an array of holes.

17. The low profile photoionization detector assembly of claim 16, wherein the sensing electrode and the bias electrode are printed such that diameters of the holes of the sensing electrode are larger than diameters of the holes of the bias electrode.

18. The low profile photoionization detector assembly of claim 14, wherein the flexible substrate comprises polytetrafluoroethylene (PTFE).

* * * * *